US009100783B2

United States Patent
DeMerchant et al.

(10) Patent No.: US 9,100,783 B2
(45) Date of Patent: Aug. 4, 2015

(54) AUTOMATIC FRIEND FOLLOWING APPLICATION

(71) Applicant: SONY CORPORATION, Tokyo (JP)

(72) Inventors: Marvin DeMerchant, San Diego, CA (US); Steven Friedlander, San Diego, CA (US); David Andrew Young, San Diego, CA (US); David Thiele, San Diego, CA (US)

(73) Assignee: Sony Corporation, Tokyo (JP)

( * ) Notice: Subject to any disclaimer, the term of this patent is extended or adjusted under 35 U.S.C. 154(b) by 283 days.

(21) Appl. No.: 13/893,633

(22) Filed: May 14, 2013

(65) Prior Publication Data
US 2014/0342753 A1    Nov. 20, 2014

(51) Int. Cl.
| | |
|---|---|
| *H04W 4/02* | (2009.01) |
| *G06Q 50/00* | (2012.01) |
| *H04W 4/20* | (2009.01) |
| *H04W 76/00* | (2009.01) |
| *H04L 29/08* | (2006.01) |
| *G01C 21/36* | (2006.01) |
| *H04W 4/00* | (2009.01) |
| *H04M 1/60* | (2006.01) |
| *H04M 1/725* | (2006.01) |

(52) U.S. Cl.
CPC ............... *H04W 4/02* (2013.01); *G01C 21/362* (2013.01); *G06Q 50/01* (2013.01); *H04L 67/18* (2013.01); *H04W 4/206* (2013.01); *H04W 76/00* (2013.01); *H04M 1/6075* (2013.01); *H04M 1/7253* (2013.01); *H04M 1/72572* (2013.01); *H04W 4/008* (2013.01)

(58) Field of Classification Search
CPC ......................................................... H04W 4/02
USPC .............. 455/456.1, 456.2, 456.3, 456.6, 457
See application file for complete search history.

(56) References Cited

U.S. PATENT DOCUMENTS

| | | | |
|---|---|---|---|
| 8,073,461 B2 | 12/2011 | Altman et al. | |
| 8,369,867 B2 | 2/2013 | Van Os et al. | |
| 2008/0255754 A1* | 10/2008 | Pinto | 701/119 |
| 2009/0143079 A1 | 6/2009 | Klassen et al. | |
| 2010/0062794 A1* | 3/2010 | Han | 455/457 |
| 2012/0008526 A1 | 1/2012 | Borghei | |
| 2012/0046862 A1 | 2/2012 | Griffin et al. | |
| 2012/0052870 A1 | 3/2012 | Habicher | |

OTHER PUBLICATIONS

James Nord, Kare Synnes, Peter Parnes, "An Architecture for Location Aware Applications" Proceeding of the 35th Hawaii International Conference on System Sciences—2002, http://pure.ltu.se/portal.

(Continued)

*Primary Examiner* — Christopher M Brandt
(74) *Attorney, Agent, or Firm* — John L. Rogitz

(57) ABSTRACT

Two friends can pair wireless communication devices which subsequently exchange positional information peer-to-peer or through a cloud server. Each device presents a map showing its location and the location of the paired device. Instructions can be provided to the device playing a follower role of how to reach the current location of the other device, which plays a leader role. In turn the leader device can present information as to the location of the follower device so that a user of the leader device can ascertain if the follower is off-track.

15 Claims, 3 Drawing Sheets

(56) References Cited

OTHER PUBLICATIONS

Rachel Fithian, Giovanni Iachelo, Jehan Moghazy, Zachary Pousman, John Stasko, "The design and evaluation of a mobile location-aware handheld event planner", College of computing/ GVU Center, Georgia Institute of Technology, 2003—http://pdf.aminer.org/000/495/127/the_design_and_evaluation_of_a_mobile_location_aware_handheld.pdf.

* cited by examiner

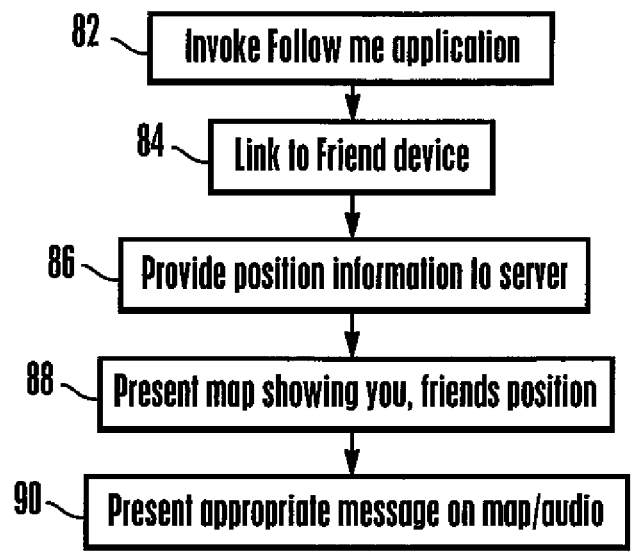
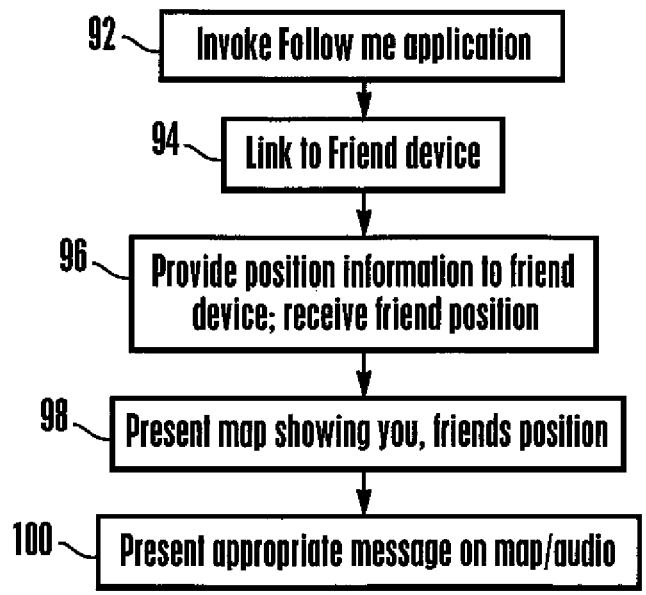

AUTOMATIC FRIEND FOLLOWING APPLICATION

FIELD OF THE INVENTION

The present application relates generally to computer-based applications to facilitate one friend following another.

BACKGROUND OF THE INVENTION

A common happenstance is for two friends to meet and then to decide to drive separately to a location (but perhaps not address) known to one friend but not the other. In such a case, particularly when a destination address is not known and a follower cannot conveniently use a map application in his vehicle, one friend typically follows the other. As understood herein, owing to traffic lights and other exigencies of travel, however, it is not uncommon for the friends to become separated, then attempt to call each other, explain each other's whereabouts, and try to get back on track.

A similar concern can arise in other venues, such as two groups of friends at an amusement park in which one group heads for one location and the other group heads for another location, with the intent to rejoin groups later in the day. Under these circumstances a person in each group may attempt to content each other but explaining where one's group is in a large amusement park to the other person can be frustrating.

SUMMARY OF THE INVENTION

An apparatus includes computer readable storage medium that is not a carrier wave and that is accessible to a client processor in a client device and bearing instructions which when executed by the client processor configure the client processor to execute a method including establishing communication with a user processor in a user device different from the client device. The user device and client device are associated with respective first and second users. The client device executing the instructions receives positional information at the client device indicating a position of the user device, and presents a map and/or directions on the client device to a location of the user device as indicated by the positional information.

In some implementations establishing communication is executed by pairing the client device and user device using near field communication. If desired, the method executed by the client processor when configured with the instructions includes receiving the positional information of the user device directly from the user device in peer-to-peer communication. In examples, the method executed by the client processor when configured with the instructions includes receiving the positional information of the user device from a network server. In other examples, the method executed by the client processor when configured with the instructions includes providing a position of the client device to a server which also the receives positional information indicating the position of the user device, receiving a selection from the second user of the client device to be a follower or a leader, and responsive to selection to be the follower, presenting the map on the client device in a first configuration. Responsive to selection to be the leader, the map is presented on the client device in a second configuration different from the first configuration. A message may be presented on the client device indicating directions to the user device. A message may be presented on the client device indicating a location of the user device to enable the second user of the client device to ascertain if the first user of the user device is correctly following the client device.

In another aspect, an apparatus includes computer readable storage medium that is not a carrier wave and that is accessible to a client processor in a client device and bearing instructions which when executed by the client processor configure the client processor to execute a method including pairing the client device with a user device using a short range wireless communication pairing protocol. The method may also include presenting on the client device a user interface (UI) including a first selection element and a second selection element. Responsive to selection of the first selection element, a UI is presented on the client device showing a map which illustrates a position of the client device, a position of the user device, and a route therebetween. The map is updated periodically to reflect movement of the client device and user device. Also responsive to selection of the first selection element, a follower message is presented on the client device advising of a next move to maintain a trail on the user device such that a user of the client device not know a destination to which he is being led, much less the address, but need only follow the user device using the UI.

In contrast, responsive to selection of the second selection element, a UI is presented on the client device showing a map which illustrates a position of the client device, a position of the user device, and a route therebetween. The map is updated periodically to reflect movement of the client device and user device. Also responsive to selection of the second selection element, a leader message is presented on the client device advising of a location of the user device based on positions of the client device and user device such that a user of the client device is advised of where the user device is without having to call the user device, thereby avoiding unnecessary calls to the user device and enabling a user of the client device to immediately ascertain if the user device has gone off an intended track.

In another aspect, a method includes communicatively pairing a first wireless communication device (WCD) with a second WCD. The method includes exchanging positional information with the second WCD, and presenting a map on the first WCD showing a location of the first WCD and a location of the second WCD based on the positional information.

The details of the present invention, both as to its structure and operation, can best be understood in reference to the accompanying drawings, in which like reference numerals refer to like parts, and in which:

BRIEF DESCRIPTION OF THE DRAWINGS

FIG. 7 is a flow chart of example logic in a cloud server environment; and

FIG. 8 is a flow chart of example logic in a peer-to-peer environment.

DETAILED DESCRIPTION OF THE PREFERRED EMBODIMENT

Figure 1:
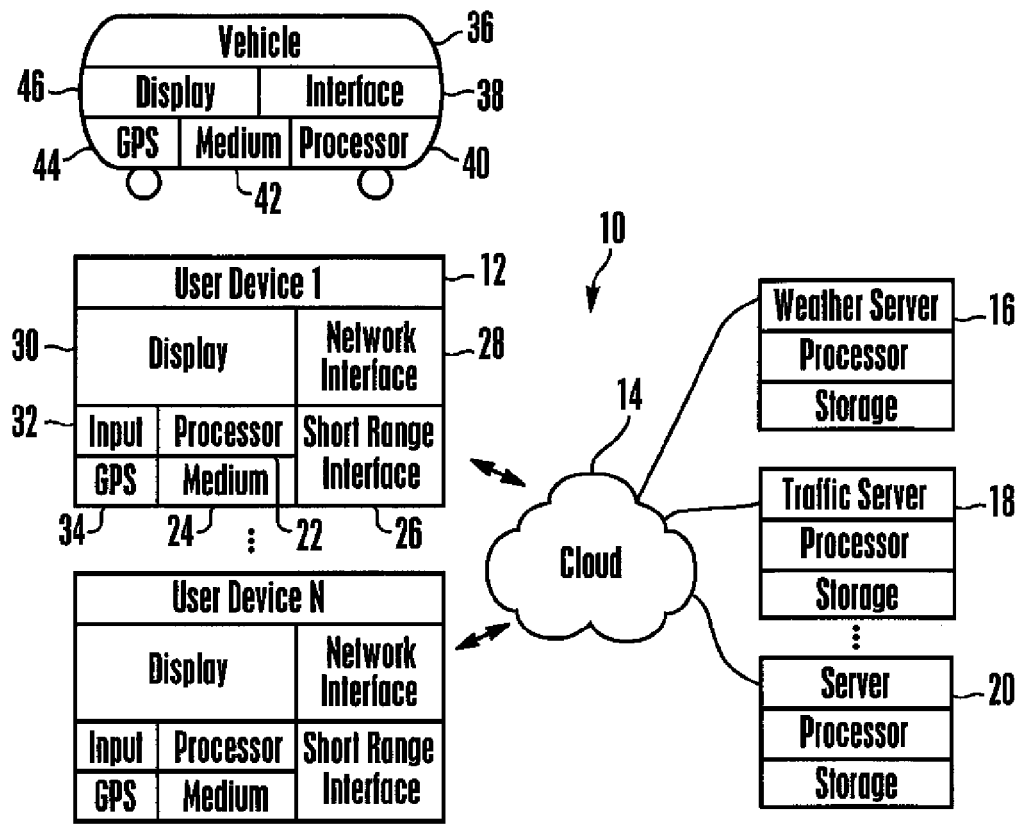
FIG. 1 is a block diagram of an example system according to present principles.

Disclosed are methods, apparatus, and systems for a computer based user information. A system herein may include server and client components, connected over a network such that data may be exchanged between the client and server components. The client components may include one or more computing devices. These may include personal computers, laptops, tablet computers, and other mobile devices including smart phones. These client devices may operate with a variety of operating environments. For example, some of the client computers may be running Microsoft Windows® operating system. Other client devices may be running one or more derivatives of the Unix operating system, or operating systems produced by Apple® Computer, such as the IOS® operating system, or the Android® operating system, produced by Google®. While examples of client device configurations are provided, these are only examples and are not meant to be limiting. These operating environments may also include one or more browsing programs, such as Microsoft Internet Explorer®, Firefox, Google Chrome®, or one of the other many browser programs known in the art. The browsing programs on the client devices may be used to access web applications hosted by the server components discussed below.

Server components may include one or more computer servers executing instructions that configure the servers to receive and transmit data over the network. For example, in some implementations, the client and server components may be connected over the Internet. In other implementations, the client and server components may be connected over a local intranet, such as an intranet within a school or a school district. In other implementations a virtual private network may be implemented between the client components and the server components. This virtual private network may then also be implemented over the internet or an intranet.

The data produced by the servers may be received by the client devices discussed above. The client devices may also generate network data that is received by the servers. The server components may also include load balancers, firewalls, caches, and proxies, and other network infrastructure known in the art for implementing a reliable and secure web site infrastructure. One or more server components may form an apparatus that implement methods of providing a secure community to one or more members. The methods may be implemented by software instructions executing on processors included in the server components. These methods may utilize one or more of the user interface examples provided below in the appendix.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as the AMD® Athlone® II or Phenom® II processor, Intel® i3®/i5®/i7® processors, Intel Xeon® processor, or any implementation of an ARM® processor. In addition, the processor may be any conventional special purpose processor, including OMAP processors, Qualcomm® processors such as Snapdragon®, or a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. The description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be written in any conventional programming language such as C#, C, C++, BASIC, Pascal, or Java, and run under a conventional operating system. C#, C, C++, BASIC, Pascal, Java, and FORTRAN are industry standard programming languages for which many commercial compilers can be used to create executable code. The system may also be written using interpreted languages such as Pert Python or Ruby. These are examples only and not intended to be limiting.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a, computer-readable medium. Computer-readable media include both computer storage media and communication media including any medium that facilitates transfer of a computer program from one place to another. However, a computer readable storage medium is not a carrier wave, and may be any available media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.) It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

Referring initially to FIG. 1, a system 10 includes at least one and in the example shown "N" user or client devices 12 communicating via a computer cloud 14 such as the Internet with one or more server computers. In the example shown, a weather server 16, a traffic server 18, and in general one or more servers 20 communicate with the client device 12 through the cloud. The traffic server may download map information to mobile devices executing map applications.

Among the non-limiting and example components a client device 12 may incorporate, a processor 22 accesses a computer readable storage medium 24 that contains instructions which when executed by the processor configure the processor to undertake principles disclosed below. The client device 12 may communicate with other client devices using a wireless short range communication interface 26 such as but not limited to a Bluetooth transceiver controlled by the processor 22. Also, the client device 12 may communicate with the cloud 14 using a wireless network interface 28 such as but not limited to one or more of a WiFi transceiver, wireless modem, wireless telephony transceiver, etc. controlled by the processor 22. Wired interfaces 26, 28 are also contemplated.

The client device typically includes a visual display 30 such as a liquid crystal display (LCD) or light emitting diode (LED) display or other type of display controlled by the processor 22 to present demanded images. The display 30 may be a touch screen display. In addition, one or more input devices 32 may be provided for inputting user commands to the processor 22. Example input devices include keypads and keyboards, point-and-click devices, a microphone inputting voice commands to a voice recognition engine executed by the processor 22, etc. A position sensor 34 may input signals to the processor 22 representing a location of the client device 12. While FIG. 1 assumes that the position receiver 34 is a global positioning satellite (GPS) receiver, other position sensors may be used in addition or in lieu of a GPS receiver. For example, accelerometers, gyroscopes, magnetic sensors, and the like may be used to input position information to the processor 22.

FIG. 1 also shows that a person carrying the client device 12 may decide to enter a vehicle 36. The vehicle 36 may include a communication interface 38 controlled by a vehicle processor 40 accessing a computer readable storage medium 42. The interface 38 may be configured to communicate with one of the interfaces of the client device 12 and may be a Bluetooth transceiver. The vehicle 36 may include an onboard GPS receiver 44 or other position receiver sending signals to the processor 40 representing the location of the vehicle 36. The vehicle processor 40 may control a visual display 46 in the vehicle to, e.g., present an electronic map thereon and other user interfaces. Other client devices may be transported by their users into other vehicles and establish communication with the processors of the other vehicles.

Figure 2:
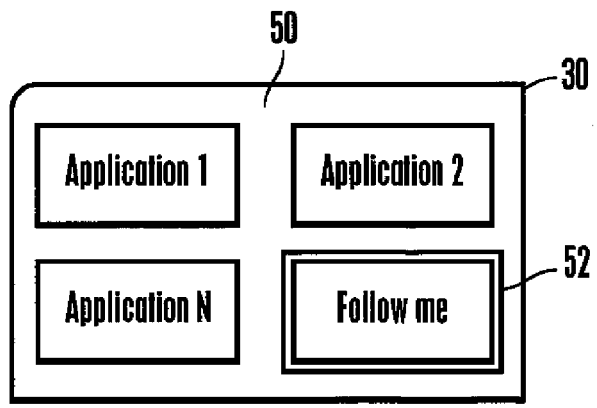
FIG. 2 is a screen shot showing an app selector user interface (UI)

FIG. 2 shows an application ("app") selection user interface (UI) 50 that may be presented on one or both displays of two user devices. The UI 50 includes, among plural selector elements each being selectable as by touching on a touch screen to invoke an underlying app, a selector element 52, titled for convenience of description only a "follow me" app. Selection of the selector element 52 launches an app in accordance with present principles to present a UI 54 shown in FIG. 3. Typically, for two friends who wish to employ present principles, each will invoke the "follow me" app on their own device. In the following example, one friend is interchangeably referred to as the "first user", "follower", and "John" and the other friend is interchangeably referred to as the "second user", "leader", and "Fred".

Figure 3:
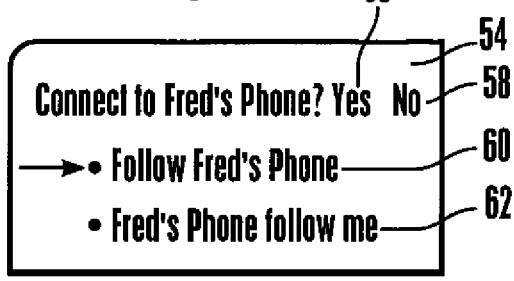
FIG. 3 is a screen shot showing an example main UI for a "follow me" app with the user selecting to be a follower.

As shown in FIG. 3, the UI 54 may, in response to, for example, automatically detecting a nearby wireless device within communication range of the short range communication interface 26 of the user's device, present a message inquiring if the user of the device on which the UI 54 is presented wants to connect or "pair" with the detected device nearby. In one example the two devices auto detect each other using Bluetooth but it is to be understood that other device discovery protocols can be used. By "pairing" is meant that the devices remain in communication with each other, typically over the short range interfaces 26. However, in some embodiments the devices may remain in communication with other over either the short range interfaces 26 and/or the network interfaces 28 via the cloud or network.

Note that the "follow me" app may be set to run in the background of two devices and that pairing may not require the UI 54 of FIG. 3, but may entail two users simply contacting their phones together as sensed by, e.g., respective accelerometers in each device. Signals from the accelerometers or other contact sensors may be sent to the respective processors, which interpret the signals as commands to pair with the other device.

Assume for disclosure purposes that the UI 54 is invoked and that both users select "yes" option 56 from their respective apps. Note that the user of the UI 54 in FIG. 3 may also select a "no" option 58 not to pair with the detected nearby device. Selecting "yes" can cause a "follow" selection element 60 to appear to enable the user to select to follow the paired device, and a "lead" selection element 62 to appear to enable the user to select to lead the paired device. Typically, the user of one paired device selects the "follow" element 60 while the user of the other paired device selects the "lead" element 62. Note that the UI 54 assumes that device discovery during pairing has resulted in a name exchange between the two devices, so to illustrate this, the figures assume one device is named "Fred's phone" and one device is named "John's phone".

Assume a first user (the follower, "John") has selected the follow element 60, and that the two users then separate by, e.g., each entering his own vehicle, one user to drive away and lead the other user to a destination.

Accordingly, after pairing a follower UI 66 appears on the display of the first user's device showing a map which illustrates a position 68 of the device (i.e., the first user in company with the device) and a position 70 of the second user (in this case, the leader named "Fred" or "Fred's phone"). Note that the map in the UI 66 may be received in near real time from a cloud server or may be stored in the device. This UI is updated, e.g., every few seconds, so that the first user can view the map as shown and immediately see the route in near-real time between him and the second (leader) user. Should the two paired devices separate even more, the map is changed accordingly to show the route between the two (moving) devices.

Also, a follower message 72 may be presented on the device visually on the display as shown or audibly, telling the follower user the next move to maintain the trail on the leader based on the map data that is available to the processor. In the example shown, the message 72 is derived by the processor from the map, which determines that the leader has turned left from Main Street on to Maple and so instructs the follower that the follower's next move is to turn left on Maple. In this way, the follower need not know the destination to which he is being led, much less the address, but need only follow the leader device using the UI 66.

Figure 5:
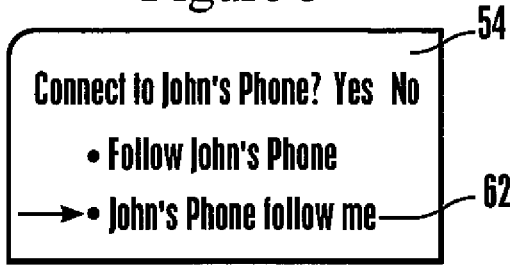
FIG. 5 is a screen shot of the example main UI the user selecting to be the person being followed.

Having described the follower UI features, attention is turned to FIG. 5 which shows once again the main "follow me" UI 54 shown in FIG. 3, except that the user has selected to be the leader by selecting "John's phone follow me", i.e., the "lead" selection element 62. It will readily be appreciated that in this example, the first user who selected the follower selection element 60 in FIG. 3 is the follower, and that the user selecting in FIG. 5 is the second, leader user.

In response, a leader map UI 74 is presented on the device of the second user who selected the lead selection element 62 from the main UI 54. As shown, the leader map UI 74 shows on the display of the device a map which illustrates the position 76 of the device (i.e., the second or leader user in company with the device) and a position 78 of the first user (in this case, the follower) whose device was paired to the leader device previously. Note that the map in the UI 74 may be received in near real time from a cloud server or may be stored in the device. This UI is updated, e.g., every few seconds, so that the second (leader) user can view the map as shown and immediately see the route in near-real time between him and the first (follower) user. Should the two paired devices separate even more, the map is changed accordingly to show the route between the two (moving) devices.

Also, a leader message 80 may be presented on the device visually on the display as shown or audibly, telling the leader the relative location of the follower based on the mapped positions between the two. Thus, in the example shown, the message 80 is derived by the processor from the map, which determines that the follower is a quarter mile away from the leader, still on Maple. In this way, the leader knows where the follower is without having to call the follower. Unnecessary calls can be distraction and a nuisance. However, the leader can monitor the follower's progress using the UI 74 to immediately ascertain if the follower has gone off track, in which case the leader can then call the follower.

FIGS. 7 and 8 show logic that can be programmed into the processors 22 of the leader and follower devices by means of the above-described "app", for example, to undertake present principles. FIG. 7 assumes a cloud server environment. Commencing at block 82, each user invokes the "follow me" app on his device, and then at block 84 links or pairs with the his friend's device as described above. The processor executing the app provides the position of the device to the server at block 86 along with instructions that the "follow me" app is executing and the identification of the other paired device. The server thus interprets the instructions as a command to send the position of the leader device to the follower device and vice-versa. Position information can be provided to the server by uploading GPS information to the server, which may be the traffic server 18 shown in FIG. 1, or by providing WiFi or wireless telephony signals through the network interface 28 of the device, which are then triangulated or otherwise processed by a server/base station to the position of the device. In any case, both the leader and follower device provide their positions to the server along with the identification of the paired device to which it is desired to send positional information.

Figure 4:
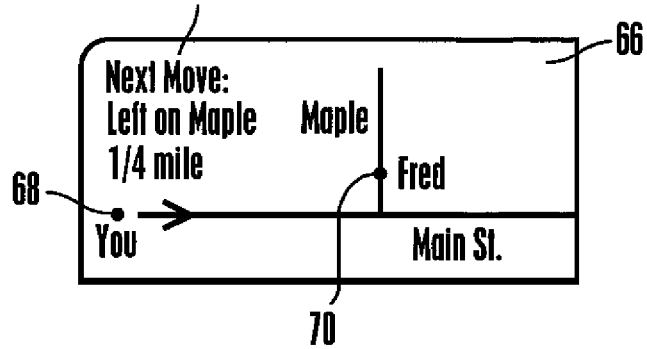
FIG. 4 is a screen shot showing an example follower UI.
Figure 6:
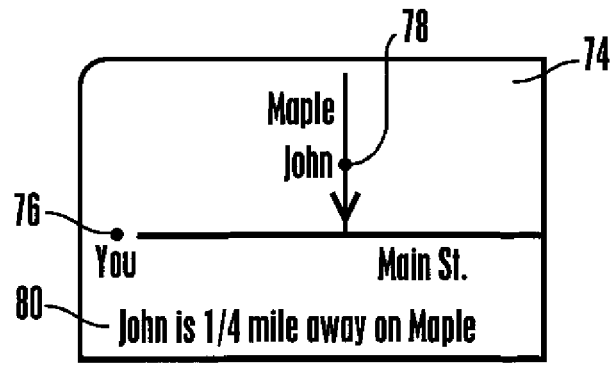
FIG. 6 is a screen shot showing an example person-being-followed UI.

Moving to block 88, the user's selection to be the follower or leader from the main UI 54 may be provided to the server if desired so that the server sends map information that appropriately configures the UI either as the follower UI of FIG. 4 or the leader UI of FIG. 6. Or, the server need not know who the follower or leader is but may simply provide positional information to both devices, whose internal processors appropriately configure the map to be a follower map or a leader map. The appropriate message 72 or 80 is presented at block 90, audibly and/or visually on the user's device.

FIG. 8 illustrates a peer-to-peer environment in which the leader and follower devices communicate directly with each other using the network interface 28 of each device. Commencing at block 92, each user invokes the "follow me" app on his device, and then at block 94 links or pairs with his friend's device as described above. The processor executing the app provides the position of the device to the other, paired device at block 96. This can be done by uploading GPS information to the paired device. In any case, both the leader and follower device provide their positions to each other.

Moving to block 98, the user's selection to be the follower or leader from the main UI 54 is used to drive which map UI is presented on the device, either the follower UI 66 of FIG. 4 (for the follower device) or the leader UI 74 of FIG. 6 (for the leader device). The appropriate message 72 or 80 is presented at block 100, audibly and/or visually on the user's device.

It is to be understood that the devices discussed above may be incorporated directly into respective vehicles, so that two friends can park near each other, establish the desired leader/follower roles, and drive away without resorting to the use of portable devices.

It will be further appreciated that above logic and UIs may also be used in other venues for other purposes. For example, one person in a first group of friends at an amusement park can select to be the "leader" and a second person in a second group of the friends can select to be the "follower". The two groups may then go their separate ways and monitor each other to facilitate meeting at the end of the day or for a meal.

Note that the leader device can, by tapping against the follower device to send through NFC, or by emailing or by sending a SMS message, or by other communication means can send a URL to the follower device to a website that is sharing only the leader's location until the leader device app quits or the leader phone stops sending location updates to the web site. The flower device then accesses the web site to obtain the location of the leader device. The follower device automatically inputs the location of the leader device into a map application being executed on the follower device so that the user of the follower device can view the location of the leader device according to principles above. This eliminates the need for the leader device to direct connect to the follower device to provide location updates to the follower device, as well as the need for a special application apart from a map application and a web browser to be installed on the follower device.

Additionally, it is to be understood that more than one follower can follow a single leader using principles above. In such a case, the leader device is designated as such using, for example, the UI of FIG. 3 or FIG. 5 and as many follower devices use the UIs as described above the follow the leader.

While the particular AUTOMATIC FRIEND FOLLOWING APPLICATION is herein shown and described in detail, it is to be understood that the subject matter which is encompassed by the present invention is limited only by the claims. what is claimed is:

What is claimed is:

1. Apparatus comprising:
    at least one computer memory that is not a transitory signal and that comprises instructions executable by at least one client processor in a client device for:
    pairing the client device with a user device using a short range wireless communication pairing protocol;
    presenting on the client device a user interface (UI) including a first selection element and a second selection element;
    responsive to selection of the first selection element, presenting on the client device a UI showing a map which illustrates a position of the client device, a position of the user device, and a route therebetween, the map being updated periodically to reflect movement of the client device and user device;
    responsive to selection of the first selection element, presenting on the client device a follower message advising of a next move to maintain a trail on the user device such that a user of the client device not know a destination to which he is being led, much less the address, but need only follow the user device using the UI;
    responsive to selection of the second selection element, presenting on the client device a UI showing a map which illustrates a position of the client device, a position of the user device, and a route therebetween, the map being updated periodically to reflect movement of the client device and user device;
    responsive to selection of the second selection element, presenting on the client device a leader message advising of a location of the user device based on positions of the client device and user device such that a user of the client device is advised of where the user device is without having to call the user device, thereby avoiding unnecessary calls to the user device and enabling a user of the client device to immediately ascertain if the user device has gone off an intended track.

2. The apparatus of claim 1, wherein the instructions are executable for:
presenting a message on the client device inquiring if a user of the client device wants to establish communication with the user device.

3. The apparatus of claim 1, wherein the instructions are executable for:
responsive to a command to establish short range communication with the user device, "pairing" with the user device.

4. The apparatus of claim 3, wherein the short range communication is Bluetooth.

5. The apparatus of claim 1, wherein the first selection element is a "follow" selection element and the second selection element is a "lead" selection element.

6. A method comprising:
pairing a client device with a user device using a short range wireless communication pairing protocol;
presenting on the client device a user interface (UI) including a first selection element and a second selection element;
responsive to selection of the first selection element, presenting on the client device a UI showing a map which illustrates a position of the client device, a position of the user device, and a route therebetween, the map being updated periodically to reflect movement of the client device and user device;
responsive to selection of the first selection element, presenting on the client device a follower message advising of a next move to maintain a trail on the user device such that a user of the client device not know a destination to which he is being led, much less the address, but need only follow the user device using the UI;
responsive to selection of the second selection element, presenting on the client device a UI showing a map which illustrates a position of the client device, a position of the user device, and a route therebetween, the map being updated periodically to reflect movement of the client device and user device;
responsive to selection of the second selection element, presenting on the client device a leader message advising of a location of the user device based on positions of the client device and user device such that a user of the client device is advised of where the user device is without having to call the user device, thereby avoiding unnecessary calls to the user device and enabling a user of the client device to immediately ascertain if the user device has gone off an intended track.

7. The method of claim 6, comprising:
presenting a message on the client device inquiring if a user of the client device wants to establish communication with the user device.

8. The method of claim 6, comprising:
responsive to a command to establish short range communication with the user device, "pairing" with the user device.

9. The method of claim 8, wherein the short range communication is Bluetooth.

10. The method of claim 6, wherein the first selection element is a "follow" selection element and the second selection element is a "lead" selection element.

11. An apparatus comprising:
at least one client processor in a client device;
at least one display controlled by the client processor; and
at least one computer memory comprising instructions executable by the at least one client processor to:
pair the client device with a user device using a short range wireless communication pairing protocol;
present on the client device a user interface (UI) including a first selection element and a second selection element;
responsive to selection of the first selection element, present on the client device a UI showing a map which illustrates a position of the client device, a position of the user device, and a route therebetween, the map being updated periodically to reflect movement of the client device and user device;
responsive to selection of the first selection element, present on the client device a follower message advising of a next move to maintain a trail on the user device such that a user of the client device not know a destination to which he is being led, much less the address, but need only follow the user device using the UI;
responsive to selection of the second selection element, present on the client device a UI showing a map which illustrates a position of the client device, a position of the user device, and a route therebetween, the map being updated periodically to reflect movement of the client device and user device;
responsive to selection of the second selection element, present on the client device a leader message advising of a location of the user device based on positions of the client device and user device such that a user of the client device is advised of where the user device is without having to call the user device, thereby avoiding unnecessary calls to the user device and enabling a user of the client device to immediately ascertain if the user device has gone off an intended track.

12. The apparatus of claim 11, wherein the instructions are executable to:
present a message on the client device inquiring if a user of the client device wants to establish communication with the user device.

13. The apparatus of claim 11, wherein the instructions are executable to:
responsive to a command to establish short range communication with the user device, "pair" with the user device.

14. The apparatus of claim 13, wherein the short range communication is Bluetooth.

15. The apparatus of claim 11, wherein the first selection element is a "follow" selection element and the second selection element is a "lead" selection element.

* * * * *